May 17, 1932.   E. REICH   1,859,004

HEATING DEVICE

Filed May 20, 1927   3 Sheets-Sheet 1

Inventor
Ernest Reich
by Henry Weeh
Attorney.

May 17, 1932. E. REICH 1,859,004
HEATING DEVICE
Filed May 20, 1927  3 Sheets-Sheet 2

Inventor
Ernest Reich
by Henry Mech
Attorney.

May 17, 1932.　　　　E. REICH　　　　1,859,004
HEATING DEVICE
Filed May 20, 1927　　　3 Sheets-Sheet 3

Inventor
Ernest Reich
by Henry Blech
Attorney.

Patented May 17, 1932

1,859,004

UNITED STATES PATENT OFFICE

ERNEST REICH, OF CHICAGO, ILLINOIS

HEATING DEVICE

Application filed May 20, 1927. Serial No. 192,941.

The invention relates to heating devices and more particularly to devices known as grills or toasters.

It is an object of the invention to provide a device of the character described having a plurality of co-operating heating plates arranged to be separated and brought in contact by a movement in parallel planes so as to exert an equal pressure on the article to be heated.

It is a further object to arrange the plates in superposed relation whereby the top plate exerts a gravity pressure on the article to be heated.

A further object comprises the provision of a floating top plate which moves parallel to the bottom plate and thus insures a uniform pressure on the article interposed between the plates.

Another object constitutes the provision of a top plate which is hingedly secured at one side so as to be capable of being tilted into upright position to facilitate the introduction of articles to be heated between the plates.

It is a still further object of the invention to provide a top plate which may be swung into position to form an extension of the bottom plate whereby a greater heating surface for large articles is afforded.

With these and other objects in view, which will become apparent from a perusal of the description of the invention, the latter comprises the means described in the specification, particularly set forth in the claims forming a part thereof, and illustrated in the drawings, in which:

Figure 1:
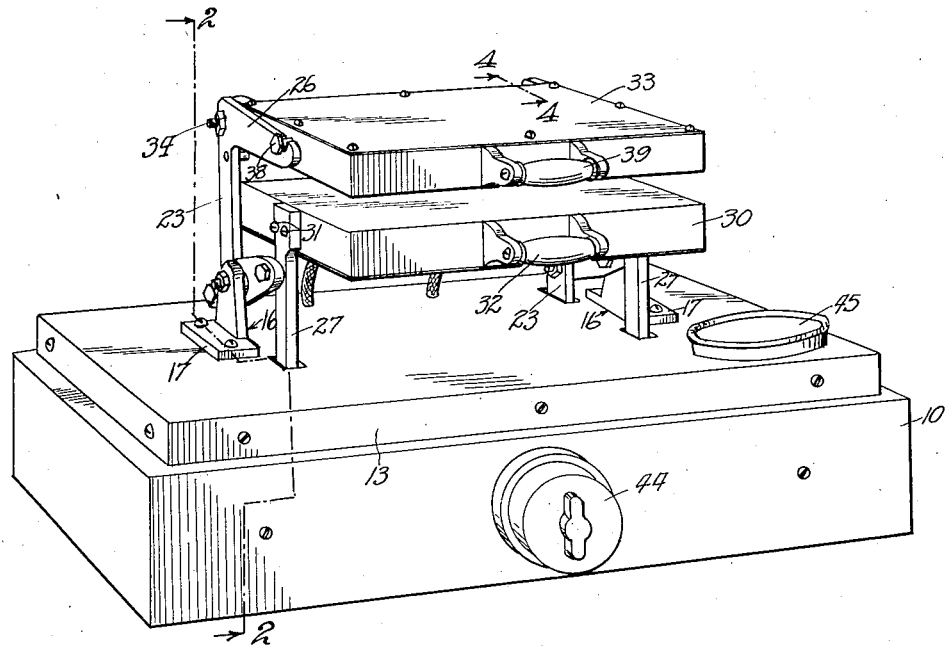
Fig. 1 is a perspective view of the device constructed in accordance with my invention.

Referring to the several views of the drawings 10 designates a hollow base preferably although not necessarily of rectangular construction.

The base is formed at the top with a horizontal flange 11 which is integral with a vertical flange 12 defining a reduced opening which is closed by a removable cover 13 fitting over the flange 12 at one side the vertical flange 12 is continued into a horizontal plate 14 extending the major portion of the top opening of the base and being bent down at the free end to form a ledge 15.

To the cover 15 are secured a pair of standards 16 which comprise a horizontal plate 17 secured to the cover 13 and an upright bearing plate integral with and at the edge of the plate and extending through registering slots 18 provided in the horizontal base plate 14 and the cover. The upright bearing plate extends with a portion 19 above the cover while a portion 20 depends below the cover. To the plate portion 19 is pivotally secured intermediate its ends a lever 21 and similarly a lever 22 is pivotally secured to the plate portion 20. An upright post 23 is pivotally secured at 24 and 25 to levers 21 and 22 and this post terminates at the upper end in a horizontal bracket 26.

A post 27 is pivotally secured at 28 and 29 to the levers 21 and 22. A heating plate 30 is received between the posts 27 and rigidly secured thereto by screws 31 to occupy a horizontal position. At the front side the heating plate 30 is equipped with a handle 32.

In superposed relation and registering with plate 30 is another heating plate 33 which is pivotally secured to the upright posts 23 at 34.

Figure 4:
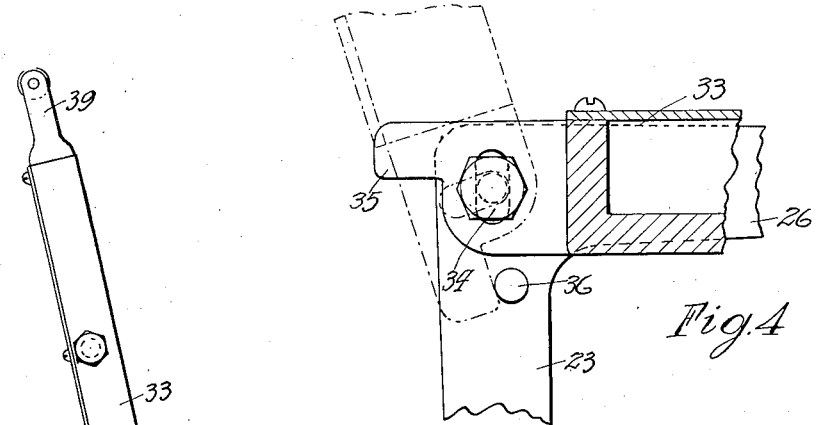
Fig. 4 is an enlarged detail section.
Figure 3:
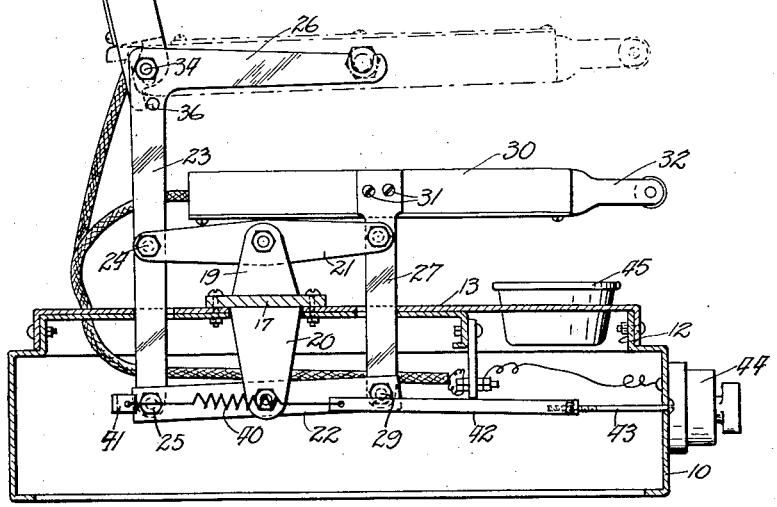
Fig. 3 is a section similar to Fig. 2 with the parts arranged in different position.

Attention is called to the fact that the pivotal connection between plate 33 includes a vertical slot 35 in the plate 33 Fig. 4 so that the latter is in floating relation to the lower plate 30. The plate 33 is formed with an integral lug 35 which is adapted to abut with a stop pin 36 of the post 23 when the top plate is swung about its pivots into upright position. The free end of the arm 26 is formed with a semi-circular recess 37 in which the shank of a bolt 38 is received projecting from the ends of the top plate and holding the same in horizontal position. The top plate is equipped with a handle 39 in juxtaposition with the handle 32.

The mode of using the device is obvious from the foregoing description:—

Figure 2:
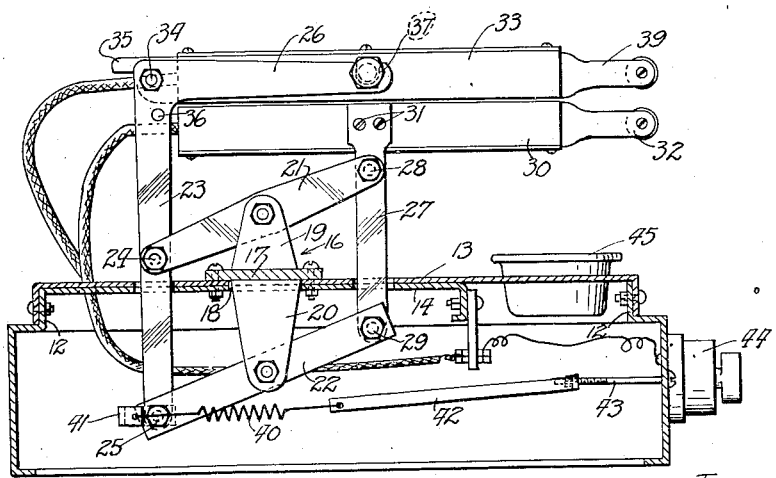
Fig. 2 is a section on the line 2—2 of Fig. 1.

By seizing the handles 39 and 32 and exerting a pressure thereon the plates 30 and 33 may be separated as shown in Fig. 1 or brought close together (Fig. 2), the plates moving through a series of parallel planes laterally and vertically caused by the parallel levers 21 and 22.

In order to lock the plates in separated or close position a spring 40 is secured at one end to a bail member 41 attached to the lower end of the post 23 while the other spring end is connected to a rod 42 which is threaded to a bolt 43 at the front side of the base 10.

A snap switch 44 at the front of the base 10 makes and breaks the circuits to the heating elements of the plates 30 and 33 but as the electrical connections do not per se form a part of this invention no further reference thereto is deemed necessary.

To one side of the cover a circular opening is provided for the reception of a cup 45 which contains fat or butter for a purpose readily understood.

Figure 9:
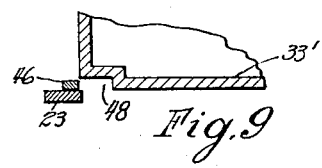
Fig. 9 is a section on the line 9—9 of Fig. 8.
Figure 8:
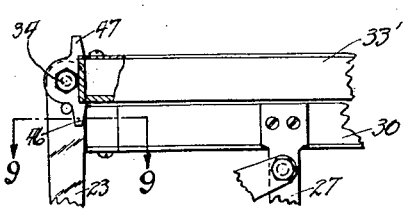
Fig. 8 is a view similar to Fig. 7 with the top plate.
Figure 5:
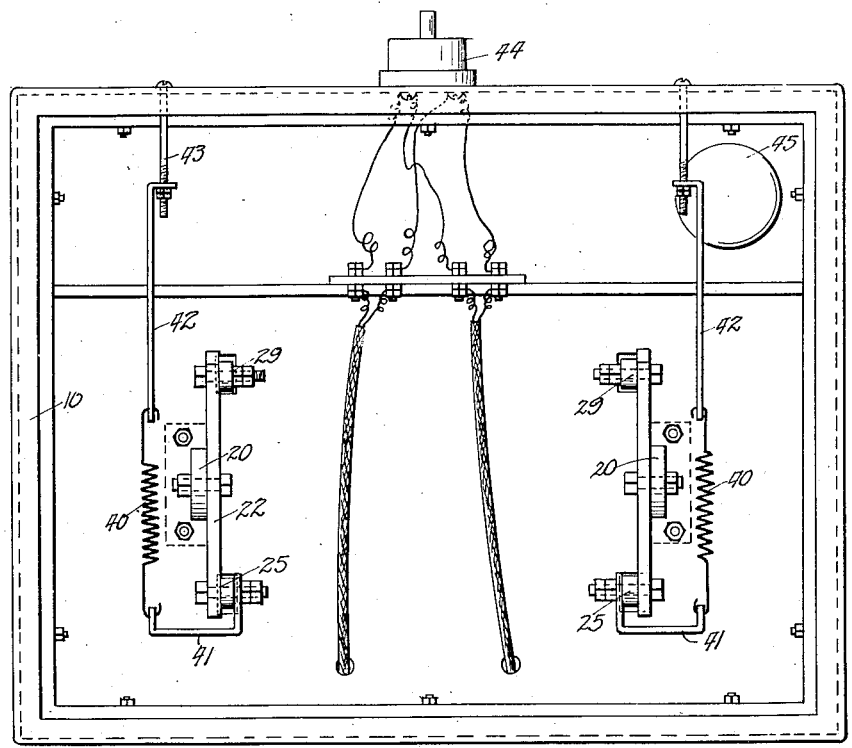
Fig. 5 is a bottom plan view of the device.
Figure 6:
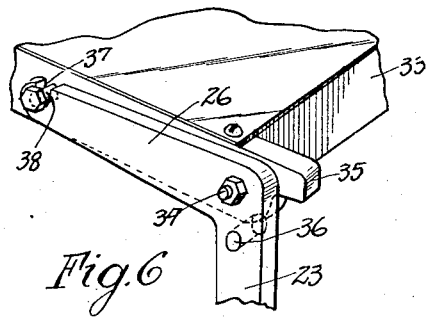
Fig. 6 is a detail perspective view.
Figure 7:
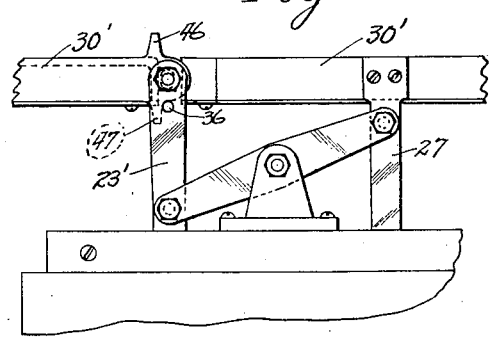
Fig. 7 is a fragmentary side view of a modified device.

In Figs. 7–9 a slight modification is shown enabling the arrangement of the top plate 33' in position parallel to the bottom plate 30' (Fig. 8), in position to form a horizontal extension thereof (Fig. 7).

As indicated the plate 33' is provided with vertical lugs 46 and 47 respectively extending upwardly and downwardly from the plate 33'.

The top plate 33' is recessed as at 48 to provide a clearance for the lugs 46 and 47 in the rotation of the plate 33 about the pivot 34 to occupy the positions shown in Figs. 7 and 8, in which as mentioned before the top plate is either in alignment with the bottom plate or forms a horizontal extension thereof.

In this case the post 23' has no horizontal arm but has a rounder end on top and the horizontal position of the plate 33' is maintained by the engagement of the lug 46 and pin 36 as shown in Fig. 8.

While the drawings show preferred embodiments of the invention, various changes and alteration may be made without departing from the spirit of the invention. I, therefore, do not limit myself to the details of construction and arrangement as shown but wish to include all changes, modifications, rearrangements and alterations constituting departures within the scope of the invention as defined in the appended claims.

I claim:

1. A heating device, including a plurality of heating plates, and means for causing said plates to reciprocate in opposite directions, said plates moving vertically and horizontally but always remaining parallel during their reciprocation.

2. A heating device, including a pair of heating plates, and means including parallel links for causing said plates to move in closed paths to approach and recede from one another but always remaining parallel during their reciprocation.

3. A heating device, including a pair of heating plates in superposed relation, the top plate being arranged in parallel relation to the other plate, and means for causing said plates to reciprocate in opposed directions but always remaining parallel during their reciprocation.

4. A heating device, including a plurality of heating plates arranged in superposed relation, means including parallel links for maintaining said plates in parallel relation, the top plate being hingedly connected at one end for tilting, and means for limiting the tilting movement of said top plate.

5. A heating device, including a pair of heating plates, means for supporting said plates in superposed relation and for vertical reciprocation in opposed directions, and means for permitting one of said plates to be tilted, said plates remaining parallel during their reciprocation.

6. A heating device, including a pair of vertically aligned heating plates, means including parallel links for maintaining said plates in parallel relation, and means for causing said plates to reciprocate in opposed directions.

7. A heating device, including a pair of vertically aligned heating plates, means for supporting said plates for reciprocation, and means for permitting one of said plates to be arranged in horizontal alignment with the other plate and in continuation thereof.

8. A heating device, including a pair of vertically aligned heating plates, means for supporting said plates for vertical reciprocation, and means for permitting said plates to be arranged in horizontal alignment and in continuation of one another.

9. A heating device, including a pair of vertically aligned heating plates, means for supporting said plates for vertical reciprocation, and means for permitting said plates to be arranged in horizontal alignment to constitute an enlarged continuous heating surface.

10. A heating device, including a pair of superposed heating plates, means for supporting said plates for vertical reciprocation, and means for permitting said plates to be arranged in vertical and in horizontal alignment, respectively, said plates in the horizontal alignment forming the continuation of one another.

11. A heating device, including a pair of heating plates arranged in superposed relation, means for supporting the top plate in floating relation to the other plate, means for supporting both plates for vertical reciprocation, and means for permitting said plates to be arranged in horizontal alignment and forming the continuation of one another.

12. A heating device, including a pair of heating plates, means including parallel links for causing said plates to move parallel to each other and in closed paths to approach and recede from one another, and means for maintaining said plates in close contact with the article arranged therebetween.

13. A heating device, including a pair of heating plates, means including parallel links for causing said plates to move parallel to each other and in closed paths to approach and recede from one another, and resilient means for maintaining said plates in close contact with the article arranged therebetween.

14. A heating device, including opposed parallel cooperating heating plates both movable toward and away from each other and adapted to assume an operative position with an article to be heated arranged therebetween and contacting therewith, and means associated with said plates tending to urge them relatively toward each other when the plates are in operative position.

15. A heating device, including opposed parallel cooperating heating plates mounted for relative movement toward and away from each other and adapted to assume an operative position with an article to be heated arranged therebetween and contacting therewith, and a spring operative to urge said plates relatively toward each other when they are in operative position.

16. A heating device, including opposed parallel cooperating heating plates mounted for relative movement toward and away from each other and adapted to assume an operative position with an article to be heated arranged therebetween and contacting therewith, a spring operative to urge said plates relatively toward each other when they are in operative position, and means for varying the tension of said spring.

17. A heating device, including opposed parallel cooperating heating plates adapted to assume an operative position with an article to be heated arranged therebetween and contacting therewith, means for effecting movement of both of said plates toward and away from each other, and means associated with said plates tending to urge them relatively toward each other when the plates are in operative position.

18. A heating device, including opposed parallel cooperating heating plates adapted to assume an operative position with an article to be heated arranged therebetween and contacting therewith, means for effecting relative movement of both of said plates toward and away from each other, and at the same time maintaining the parallelism of the plates, and means associated with said plates tending to urge them relatively toward each other when the plates are in operative position.

19. A heating device, including opposed parallel cooperating heating plates both mounted for movement toward and away from each other, and connections arranged between said plates whereby one of the plates tends to counterbalance the other.

20. A heating device, including a pair of cooperating heating plates mounted for relative movement toward and away from each other, to assume spaced and closed relations, one of said plates being hingedly connected at one side thereof for tilting toward and away from the other plate, and means operable whether the plates are in spaced or closed relation for limiting the tilting movement of said hingedly mounted plate toward and away from the other plate.

21. A heating device, including opposed heating plates, both of said plates being adapted to reciprocate, and connections between said plates whereby one of said reciprocating plates is counterbalanced by the other of said plates.

22. A heating device, including superposed heating plates, both of said plates being mounted for vertical reciprocation toward and away from each other, and connections between said plates whereby one of said reciprocating plate is counter-balanced by the other of said plates.

23. A heating device, including opposed heating plates both mounted for movement toward and away from each other, connections between said plates whereby one of the plates tends to overcome the gravity pressure of the other of said plates, and means associated with said plates tending to urge them relatively toward each other when the plates are in proximity to each other.

24. A heating device, including opposed cooperating heating plates mounted for relative movement toward and away from each other, connections between said plates whereby one of the plates tends to overcome the gravity pressure of the other of said plates, and a spring operative to urge said plates relatively toward each other when they are in proximity to each other.

25. A heating device, including opposed cooperating heating plates mounted for relative movement toward and away from each other, connections between said plates whereby one of the plates tends to overcome the gravity pressure of the other of said plates, a spring operative to urge said plates relatively toward each other when they are in proximity to each other, and means for adjusting the tension of said spring.

In witness whereof I affix my signature.

ERNEST REICH.